Figure 1:
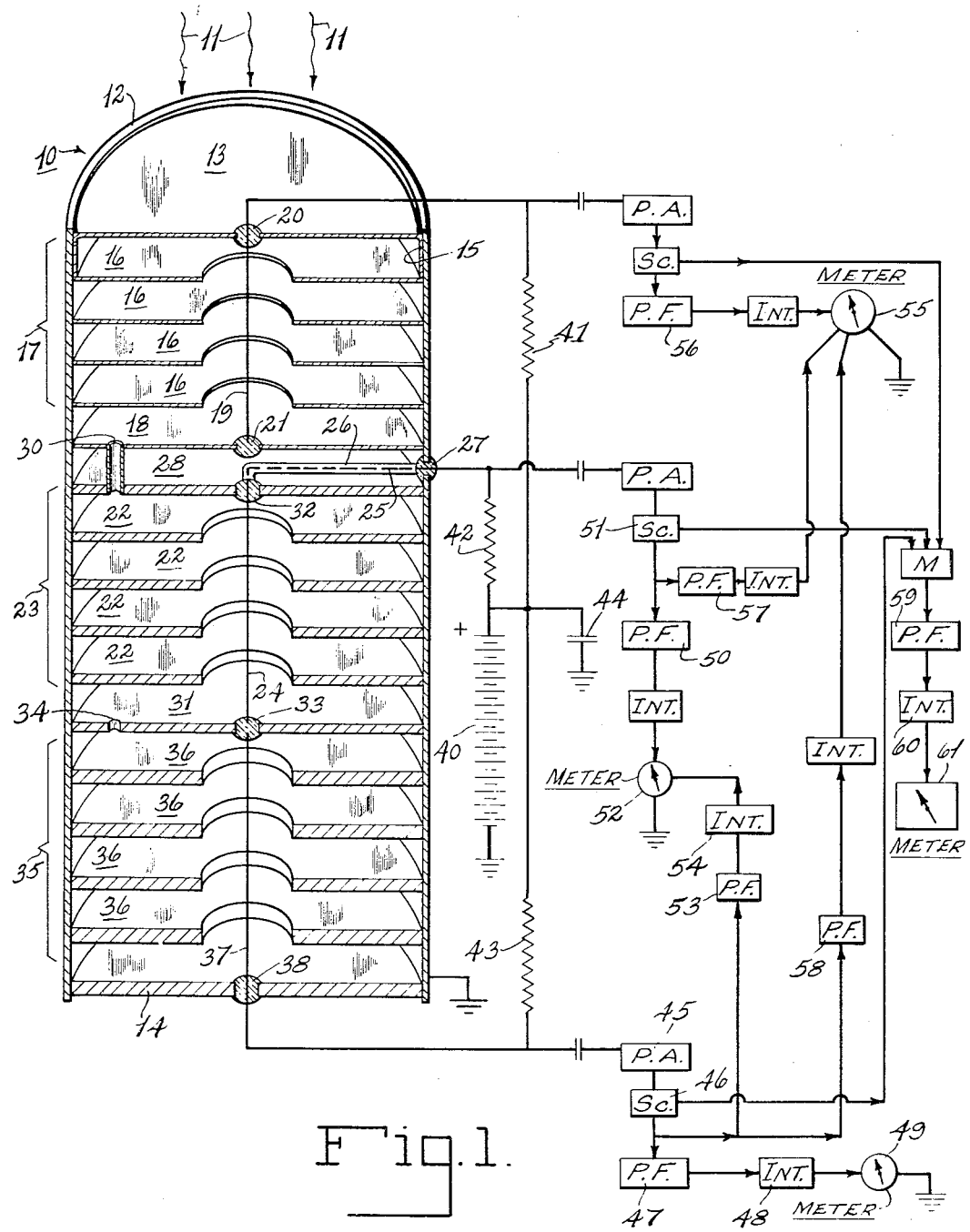

United States Patent Office 2,741,709
Patented Apr. 10, 1956

2,741,709

DETECTOR FOR INDICATING SPECTRAL DISTRIBUTION OF PENETRATIVE RADIATION

Arthur L. Tirico, Glen Ridge, N. J., and Raymond J. Ruble, Beacon, N. Y., assignors to Texaco Development Corporation, New York, N. Y., a corporation of Delaware Application April 26, 1952, Serial No. 284,615

11 Claims. (Cl. 250—83.6)

This invention relates to radiation detectors. More particularly it relates to improvements in multiple plate Geiger-Mueller detectors. For most purposes it is generally regarded as very desirable to attain the highest possible efficiencies for radiation detectors, and for this reason the multiple plate Geiger-Mueller detector is considered to constitute a considerable improvement over the original Geiger-Mueller tube. However experience indicates that the multiple plate detector may not have for all kinds of radiation the greatly increased detection efficiencies which it has for some. In fact it may not even have the same efficiency for photons of radiation which are of a single kind but occur in different spectral regions, e. g., hard and soft gamma rays.

Accordingly it is an object of the present invention to devise improvements in multiple plate Geiger-Mueller radiation detectors so that they may have optimum detecting efficiencies for gamma rays whose energies are distributed over wide spectral ranges.

In general this object has been attained through the use of a modified multiple plate cathode array comprising a number of discrete sub-arrays, i. e., discrete sets of cathode elements (or "plates"), each of which has optimum efficiency for detecting gamma rays within a respective spectral range. The sub-arrays are positioned in sequence along the mean path of the radiation through the detector in such order that no sub-array which is intended for the detection of less penetrative radiation in one predetermined spectral range, and through which certain more penetrative radiation in another predetermined spectral range must pass in order to reach a different sub-array which is intended for its detection, will have an adverse effect on the efficiency attainable in the latter sub-array. An incidental advantage which is afforded by the detector disclosed herein is that it is capable of providing information relating to the spectral distribution of the gamma rays being detected.

The single figure shown in the drawing represents a longitudinal sectional view through a multiple plate detector embodying the present invention and a block diagram of circuitry to be used in conjunction therewith.

The detector 10 shown in Fig. 1 is intended to be used for the detection of radiation approaching its top as shown at 11 in the drawing. It comprises an hermetically sealed envelope including an elongated cylinder 12 which is closed by a relatively thin window plate 13 at its top end (as it appears in the drawing) and by a relatively thick back-scattering plate 14 at its bottom end. As shown herein the window plate 13 is formed with a turned over lip 15 for sealing it into the end of the cylinder 12, this or some similar expedient being more necessary than in the case of the thicker plate 14 whose edges are more likely to suffice for a strong mechanical joint and a good seal. Immediately below the window plate 13 the detector 10 includes a plurality of relatively thin cathode elements 16 which are spaced apart from one another, in a manner known in the art for the cathode arrays of multiple plate detectors, and which effectively constitute a top sub-array 17. As will be more fully explained below this sub-array is intended for the detection of soft gammas.

The section of the detector 10 which includes the sub-array 17 is separated from the sections below it by a partition 18. Partitions like the partition 18 are used between the sub-arrays so that a Townsend avalanche may occur in the portion of the detector corresponding to any one of them without incurring the effect that the glow of ionization which thereupon occurs in the vicinity of its fine wire anode will run along the wire in both directions until it extends along substantially the full length thereof. In other words it is desirable for ionizing events to be able to occur in the individual portions of the detector without disabling the other portions by engaging them in the same events. In addition, since the other portions can be disabled by the loss of anode potential (during quenching) as well as by becoming ionized, each of the sub-arrays is provided with a separate fine wire anode, this being further advantageous if the detector is to be used for determining the spectral distribution of the radiation being detected, since the use of a single fine wire anode extending through all of the portions of the detector would make it impossible to separate signals produced in one from those produced in the others.

Accordingly a respective fine wire anode 19 is mounted under tension between a pair of glass beads 20 and 21 which are sealed into central openings of the window plate 13 and the partition 18 respectively. To this end and as is customary in multiple plate detectors the stacked cathode elements are formed with a row of aligned apertures through the centers of which the fine wire anode may extend in air-insulated relationship to the elements. Below the top sub-array 17 there is a group of cathode elements 22 which are of a relatively medium thickness. They constitute an intermedaite sub-array 23 which is intended to have its highest efficiency for the detection of gamma rays for those whose energies lay in a spectral region between those of hard and soft gamma rays. A fine wire anode 24 is provided for the sub-array 23. Since this sub-array is in an intermediate position in the detector 10 a lead 25 for the anode 24 is brought out through the side of the cylinder 12 where it can be conveniently connected to an external source of potential. Since the lead 25 will be polarized at a potential of about 1,000 volts and since it is fairly close to some of the normally-grounded metallic members of the detector it is shown to be provided with an insulating sleeve 26 of some material having a suitably high di-electric strength. Where the lead 25 comes through the side of the cylinder 12, it may be provided with an hermetic vitreous seal such as the seal 27 shown in Fig. 1.

In the embodiment shown herein the arrangement is such that the lead 25 and its insulating sleeve 26 is contained in an inactive space located between the two active portions of the detector corresponding to the sub-arrays 17 and 23. To this end the intermediate portion of the array is provided with a top partition 28 which is slightly spaced away from a bottom partition 18 for the upper portion of the detector. A small diameter tubular conduit 30 is used to provide a passageway between the interior spaces of the upper and intermediate portions of the detector 10 by being suitably attached to the partitions 18 and 28 at apertures therein into which it may be soldered, brazed, or the like. This construction permits the inactive space between the partitions 18 and 28 to be evacuated to avoid any possibility of a continuous gaseous discharge occurring between some part of the lead wire 25 and the closely adjacent grounded metallic elements of the detector while at the same time it permits simultaneous processing of more than one portion of the detector such as pumping-out, out-gassing, flushing, filling, etc. The intermediate portion of the detector is provided with a bottom partition 31 corresponding to the partition 18 for the upper portion, and its fine wire anode 24 is supported between a pair of glass beads 32 and 33 as shown. It is noted that the anode 24 extends only far enough into the bead 33 to derive adequate mechanical support from it and not far enough to come into electrical contact with the fine wire anode for the lower portion of the detector. A small aperture 34 is provided in the partition 31 to permit simultaneous processing all portions of the detector as mentioned above. Neither the aperture 34 nor the conduit 30 will suffice to allow a glow discharge to extend from one adjacent section to the other since during a Townsend avalanche the plasma density is very low near the peripheries of the cathode elements. A sub-array 35 for the lower portion of the detector 10 comprises a group of cathode elements 36 which are the thickest plates used in the detector.

Preferably the partition which is located immediately above each sub-array should be of a thickness which is equal to or less than that of the elements thereof so that in the event of an interaction in the partition by a photon in the spectral range intended for that sub-array the charged-particle by-product(s) of the interaction will be able to escape into the active discharge spaces of the array. If the space between the partitions 18 and 28 is to be inactive, i. e., evacuated, the partition 18 should be as thin as possible, that is just thick enough for it to be able to perform the functions of stopping the downward growth of plasma along the anode 19 and of supporting the bottom end of this anode and no thicker. Otherwise it may absorb a significant number of the gammas intended to be detected in the part of the detector below it without being able to convert them into counts since the charged-particle by-products, even if they could escape through the bottom of the partition, would be ineffectual to produce Townsend avalanches in the inactive space directly beneath it.

The bottom plate 14 of the detector may be a plate of relatively heavy material and/or have a relatively high electron density to serve as a back scatterer so that any occasional high energy gamma rays which may have passed through the entire cathode array will have a fair probability of undergoing a Compton interaction and thereby sending a lower energy gamma back into the bottom section of the detector. However if the bottom section is long enough, i. e., contains enough cathode elements, to absorb substantially all of the most penetrative gammas which enter it then there is no necessity of the bottom wall being of any greater thickness than is mechanically necessary, e. g., for supporting the anode and holding in the gaseous filling. The fine wire anode 37 of the lower section of the detector is supported between the glass bead 33 and a glass bead 38 which is fused into an opening in the center of the bottom plate 14.

The effectiveness of the detector-head structure described above is based on the following physical facts: (1) that a gamma ray which passes through any kind of material at all, such as through an homogeneous volume of either a gas, a liquid, or a solid or through a succession of solid plates as in the detector 10, is not decelerated or attenuated at all unless it sustains an interaction in which case, of course, it undergoes a very abrupt change. That is to say it does not gradually change in character from say a hard gamma to a medium-hard gamma and to finally a soft gamma. Each gamma ray either is entirely unchanged or it sustains an interaction and undergoes a most pronounced change such as abrupt conversion to a charged-particle and a low energy gamma in a Compton interaction or complete absorption in a "photo-electric" interaction; and (2) that the penetrative range of a charged particle produced by the interaction of any gamma ray is proportional to the energy which that ray had before the interaction. This means that though in general the charged particles produced by gamma interactions are far less penetrative than are gammas themselves, nevertheless, as among themselves, those produced by higher energy gammas are more penetrative than those by lower energy gammas. Since then soft gammas can only produce interaction by-products having short ranges, it would not be feasible to use a multiple plate detector having heavy gauge cathode elements for the detection of soft gammas. While a fairly numerous stack of such elements would absorb all of the soft gammas, i. e., involve all of them in interactions, the charged-particle by-products needed to cause Townsend avalanches would be hopelessly captive within the material of the cathode elements. Thus if the detector shown herein were to be used wrong-end-to it would not function as a polychromatic gamma detector. Instead its back scattering plate 14 and/or its bottom sub-array 35 would simply absorb most of the soft and medium-hard gammas without converting them into counts. Of course if the plate 14 is heavy enough it might even filter out the hardest gammas and thus entirely disable the detector. However when the detector 10 is used as intended the first thing encountered by each soft gamma will be a succession of cathode elements each of which is thin enough to permit escape of charged-particle by-products if the gamma has an interaction within it. While particular soft gammas may be able to penetrate one or more of these elements they will immediately encounter others and thus be exposed to repeated opportunities to have interactions. Therefore if the stack of plates comprising the top sub-array is long enough, substantially all of the soft gammas may be caused to undergo interactions. In the meanwhile if there are medium-hard and hard gammas intermixed in the flux impinging on the detector the average one of them will pass more easily through each of the elements 16 so that a substantial percentage of them will reach the intermediate portion of the detector without having been absorbed so long as the sub-array 17 does not contain a large number of elements 16 in excess of what it needs for efficient detection of the soft gammas. Here they will encounter the sub-array 23 whose elements 22 are: (1) of optimum thickness for absorbing medium-hard gammas and at the same time permitting the charged-particle by-products to escape into the gas filling of the section, and (2) just numerous enough (and no more) so that a high percentage of the medium hard gammas will be absorbed in the intermediate portion of the detector.

From the foregoing it will be seen that a substantial percentage of the hard gammas will arrive at the sub-array 35 and that they will be unaccompanied by any substantial numbers of the other gamma rays. These hard gammas will encounter cathode elements (36) which are heavy enough and numerous enough to offer a good likelihood for an interaction to substantially every one of them and yet not so thick that any charged-particle by-products which may be yielded when it does have an interaction cannot escape into the gas filling of the lower portion of the detector.

If the detector 10 is irradiated by collimated, monochromatic gamma rays in the medium-hard portion of the spectrum, then by noting the relationship between the counts produced by the top and intermediate portions of the detector it will be possible empirically to know what percentages of such gammas get to be counted respectively in the top and intermediate portions of the detector.

From the data obtained in such standardizing tests one can derive formulae which can be used to convert the direct outputs of the individual portions of the detector into corrected outputs more suitable for actuating indicators intended to present, say visually, accurate representations of the total numbers of respective soft, hard and medium-hard gammas counted by the entire detector. From the foregoing it will be apparent that the output of the top portion of the detector will be numerically larger than the total number of soft gamma counts, since the top portion not only effectively does all of the detecting of soft gammas but in addition unavoidably detects some of the medium-hard and hard ones, and that the output of the bottom portion will be numerically smaller than the total number of hard gamma counts since only hard gammas will reach the bottom portion and does not all of them at that. The numerical output of the intermediate portion may be either larger or smaller than the total number of medium-hard gamma counts depending upon the values of the data obtained in the standardizing tests. The counts actually produced in this portion of the detector will be predominantly of medium-hard gammas but in addition it will unavoidably detect some of the hard gammas intended for the bottom portion and unavoidably some of the medium-hard gammas intended for it will be detected in the top portion allotted to soft gammas.

If $Nt$, $Ni$ and $Nb$ be made to represent the respective actual output counts of the top, intermediate, and bottom portions of the detector; if $x$ be the percentage of medium-hard gammas which will be detected in the top portion of the detector; if $y$ and $z$ be the respective percentages of hard gammas which will be detected in the top and intermediate portions; and if $S$, $M$, and $H$ be made to represent respectively the total numbers of soft, intermediate-hard, and hard gammas detected in the entire detector, then, as can be mathematically demonstrated, the following formulae can be utilized to obtain accurate representations of the total numbers of soft, medium-hard, and hard gammas counted by the entire detector.

$$S = Nt - \left[\frac{x}{100-x}\right]Ni - \left[\frac{(100-x)y-xz}{(100-x)(100-y-z)}\right]Nb$$

$$M = \left[\frac{100}{100-x}\right]Ni - \left[\frac{100z}{(100-x)(100-y-z)}\right]Nb$$

$$H = \left[\frac{100}{(100-y-z)}\right]Nb$$

For any particular set of values for $x$, $y$ and $z$ these formulae can be rewritten as follows:

$$S = Nt - K_1 \cdot Ni - K_2 \cdot Nb$$
$$M = K_3 \cdot Ni - K_4 \cdot Nb$$
$$H = K_5 \cdot Nb$$

since each of the expressions contained between a pair of brackets will have some constant value. Thus if $y = 10\%$ and $z = 15\%$ the expression $$\left[\frac{100}{100-y-z}\right] \text{ is equal to } \frac{100}{75}$$

or 1.3 and may be represented by the constant $K_5$. Accordingly for any one detector the values of $S$, $M$, and $H$ may be derived entirely from the values of $Nt$, $Ni$, and $Nb$ and the values of $K_1$, $K_2$, $K_3$, $K_4$, and $K_5$, the values of $K_1$—$K_5$ having previously been derived by substituting test-data values of $x$, $y$, and $z$ in the various bracket expressions included in the above formulae and solving mathematically for the value of the total expression in each pair of brackets.

The circuitry shown in Fig. 1 provides an indication of both: (1) a single total counting rate, for the output of the entire detector, which rate is proportional to the flux density of all of the intercepted gamma rays included in a wide spectral range, i. e., proportional to the flux density of intercepted "polychromatic" gamma rays; and (2) three individual counting rates which are respectively proportional to the flux densities of discrete components of the intercepted radiations, which components lie in lower, intermediate, and upper regions ("monochromatic" regions) of the gamma ray spectrum.

A single source of potential 40 is used to energize the three portions of the detector. To this end its positive side is connected to the anodes 10, 24, and 37 over respective quenching load resistors 41, 42 and 43 and its negative side is connected to the subarrays 17, 23 and 35 via ground and the cylinder 12. If the source 40 should not have a sufficiently low internal impedance to prevent coupling between the portions of the detector over the common power supply, a decoupling condenser may be used as shown at 44. The output of each of the portions of the detector is fed to a respective series circuit comprising, in the order named, a pre-amplifier, P. A., and a scaler Sc. The pre-amplifiers and scalers are conventional components which are included in the detector's circuit for reasons which are well known. In addition a number of pulse forming circuits P. F. are used for performing the customary functions of increasing the "area" (the number of volt-microseconds) included in each pulse coming from the output of a scaler and of making that "area" uniform for all input pulses despite any small variations which may occur in their amplitudes, durations, etc., whereby each pulse former can deliver accurate and substantial currents to an integrator for various normally-to-be-expected occurrence rates for the pulses received at its input.

In addition a number of the pulse forming circuits have the added function of effectively performing a mathematical operation by which the "area" of each output pulse is made to correspond to some standard area multiplied by one of the constants $K_1$–$K_5$. A pulse former may consist of a one shot multi-vibrator (an Eccles-Jordan oscillator) which when triggered by a short pulse produces a large output pulse of controllable duration and fixed amplitude. If desired the output pulse in question may be amplified in a high gain tube which the pulse so easily drives to saturation that the amplifier squares it off sharply and fixes its amplitude accurately. As is known a suitable R. C. time constant of a one-shot multivibrator may be adjusted so that the output pulse can be lengthened or shortened at will. Therefore a pulse forming circuit may be calibrated in the following way after it is connected between the output of a scaler allotted to it and a circuit comprising an integrator, Int., and an indicating device such as a sensitive voltmeter: its said R. C. time constant may first be adjusted so that the output square waves are long enough to produce some predetermined deflection of the meter needle (say nearly full scale deflection) for some maximum intended counting rate; it may be then readjusted, while still generating pulses at the same rate, so that the needle deflection is increased or reduced, as the case may be, so that it indicates a value on the meter scale equal to the value indicated before the readjustment multiplied by a predetermined one of the constants $K_1$–$K_5$.

From the formula $H = K_5 \cdot Nb$ it will be seen that the number of hard gamma rays detected in the entire detector 10 can be derived by simply multiplying the output of the lower portion of the detector by a constant, $K_5$, which has a value somewhat greater than 1. Accordingly the circuit for actuating a meter to show the total hard gamma counting rate is a simple one which is fed solely from the lower portion of the detector. As shown in the drawing it includes in series a pre-amplifier 45, a scaler 46, a pulse former 47, an integrator 48 and a meter 49. If the pulse former 47 is calibrated according to the principles set forth above so that some predetermined standard amount of needle deflection, which is initially used for adjusting all of the pulse formers in the circuit, is modified by the factor $K_5$ in a final calibrating readjustment, then the output of the lower portion of the detector will be weighted upward and it will be possible to directly read hard gamma counting rates from it if the scale of its meter is calibrated in proper units.

The circuits for the intermediate and top portions of the detector, while not quite so simple, will be readily understood in view of the explanation which has preceded. In the case of the intermediate portion a pulse forming circuit 50 which is included between its scaler 51 and its meter 52 is calibrated to alter the needle deflection from the predetermined standard one in accordance with the constant $K_3$. However since, in order to obtain the value M, it is necessary to reduce the needle deflection of the meter 52 by an amount corresponding to the value $K_4 \cdot N_b$, a branch is provided to it from the output circuit of the bottom portion. This branch contains a pulse former 53 which is finally calibrated to alter its standard needle deflection in accordance with the constant $K_4$. The output of this pulse former is fed to an integrator 54 which is in turn fed to an auxiliary winding (not shown) of the meter 52. It is not an object of the present invention to devise novel voltage-addition or voltage-subtraction circuits and instead it is intended that any suitable available circuits be used in order to practice the principles taught herein. However by way of example it it noted that one may use meters which have more than one winding which can be separately fed to aid or oppose one another so that the net needle deflection attained is attributable to a plurality of inputs, individual ones of which may have either additive or subtractive effects on the total deflection.

In the case of the top portion of the detector, as will be apparent by reference to the formula for the value S, three inputs are fed to its meter 55. A principal input is fed to it in a positive sense from the top portion of the detector and two subtractive inputs fed to it from the intermediate and lower portions of the detector. Since the term in the formula for the principal input is the value of the output of the top portion of the detector $(Nt)$ unmultiplied by any constant, the pulse forming circuit 56 for the top portion of the detector is given only its standard calibration and is then left in that condition. Each of the output circuits for the intermediate and lower portions of the detector is provided with an additional pulse forming circuit, 57 and 58 respectively, in branch circuits for feeding respective subtractive signals to the meter 55. Accordingly these pulse forming circuits (57 and 58) are finally calibrated to alter their standard needle deflections in accordance with the constant $K_1$ and $K_2$ respectively.

Since it may be desirable directly to read the total polychromatic count of the detector the scalers of the respective output circuits of the top, intermediate and bottom portions of the detector are all connected to respective inputs of a mixer M where their output pulses are combined so that the output of the mixer is equal to the sum of the occurrence rates of the pulses coming from all three of the scalers. The mixer in turn is connected to a pulse forming circuit 59 which has been calibrated only to produce the standard needle deflection. The pulse forming a circuit 59 in turn feeds an integrator 60 and a main counting meter 61. In view of the additive effect of mixing it may be desirable to select a meter 61 having a somewhat less sensitive electro-mechanical movement than those of the meters 49, 52, and 55; or to use higher scaling rates when reading the total counting rate; or to use a different standard calibration for the pulse former 59 than for the other pulse formers.

It will be understood from the foregoing that the window plate 13 of the detector 10 should be at least as thin as, i. e., no thicker than, the elements 16 of the sub-array 17. However the terms thin or thick as used herein must be interpreted in a special way, which will be understood by those familiar with the art of radiation detection, to take into account the volume of plate material, or the number of electrons included therein, for each unit area of the surface. Accordingly another way of saying it is that the window plate 13 should have no greater absorption power for gamma rays than one of the elements 16. Thus the plate 13 may actually be thicker in linear units of measurement, e. g., inches, than an element 16, provided its electron density is proportionately lower than that of the element. For example the window plate may be made of relatively thick aluminum sheet stock while the elements 16 are made of relatively thin stock made of a material having a higher electron density, such as tantalum or stainless steel. From the foregoing it follows that the principal features of the present invention can be embodied in a detector whose respective sub-arrays comprise cathode elements of substantially equal physical thicknesses but of different electron densities.

Obviously many modifications and variations of the invention as hereinabove set forth may be made without departing from the spirit and scope thereof and only such limitations should be imposed as are indicated in the appended claims.

We claim:

1. A radiation detector of the Geiger-Mueller type comprising an envelope having a window wall for receiving on its outside surface impingement of the radiation to be detected, a multiple-plate cathode array mounted within the envelope and comprising a plurality of spaced-apart cathode elements which are substantially parallel to each other and to said wall, predetermined ones of said elements which are positioned along the array at progressively greater distances from said wall having progressively greater absorbing power for said radiation said wall having no greater absorbing power for said radiation than any of said elements.

2. A detector as in claim 1 in which said wall comprises a peripheral element of said array.

3. A radiation detector as in claim 1 in which said envelope has a back-scattering wall located on its far side from said window wall with said cathode array positioned between the two walls, said back-scattering wall having a greater absorbing power for said radiation than any of the elements of said array.

4. A radiation detector of the Geiger-Mueller type comprising an envelope having a window wall for receiving on its outside surface impingement of the radiation to be detected, a multiple-plate cathode array mounted within the envelope and comprising a plurality of spaced-apart cathode elements which are substantially parallel to each other and to said wall, predetermined ones of said elements which are positioned along the array at progressively greater distances from said wall having appropriate thicknesses and electron densities to have progressively greater absorbing power for said radiation, said wall having no greater absorbing power than any of said cathode elements.

5. A radiation detector of the Geiger-Mueller type comprising an envelope having a window wall for receiving on its outside surface impingement of the radiation to be detected, a multiple-plate cathode array mounted within the envelope and comprising a plurality of spaced-apart cathode elements which are substantially parallel to each other and to said wall, predetermined ones of said elements which are positioned along the array at progressively greater distances from said wall having progressively greater thicknesses said wall being no thicker than the thinnest of said predetermined ones of the cathode elements.

6. A radiation detector of the Geiger-Mueller type comprising an envelope having a window wall for receiving on its outside surface impingement of the radiation to be detected, a multiple-plate cathode array mounted within the envelope and comprising a plurality of spaced-apart cathode elements which are substantially parallel to each other and to said wall, predetermined ones of said elements which are positioned along the array at progressively greater distances from said wall being formed of materials having progressively greater electron densities, said wall being formed of a material which has no greater electron density than the cathode element of said predetermined ones thereof which is positioned in the array most closely adjacent to the inside surface of said wall.

7. A radiation detector of the Geiger-Mueller type comprising an envelope having a window wall for receiving impingement of radiation to be detected, a multiple-plate cathode array mounted within the envelope and comprising a plurality of spaced-apart cathode elements which are substantially parallel to each other and to said wall, said array comprising a plurality of sub-arrays, the cathode elements of the different sub-arrays having different absorbing power for said radiation.

8. A radiation detector as in claim 7 in which said wall has no greater absorbing power for said radiation than any of the elements of any of the arrays the sub-array whose elements have the least absorbing power for said radiation is positioned in said cathode array nearest to the inside surface of said wall and the sub-array whose elements have the greatest absorbing power for said radiation is positioned therein farthest from said inside surface.

9. A detector as in claim 7 in which said detector comprises a separate fine wire anode for each sub-array, said cathode elements of each sub-array comprise aligned apertures and the anode for each sub-array extends through its row of aligned apertures in insulating relationship to the elements of the sub-array.

10. Radiation detection apparatus comprising a detector as in claim 8, circuit means connected to respective external terminals for anodes of said sub-arrays for mathematically acting upon the output of at least one thereof with a value derived from the output of at least one of the others to obtain corrected outputs and means responsive to the corrected outputs to provide indications representative of the flux densities of components of said radiation to be detected which have different spectral characteristics and for which the respective sub-arrays have optimum detection efficiencies due to the different absorption power of their elements for the radiation, whereby the apparatus can provide information relating to the spectral distribution of polychromatic radiation.

11. Radiation detection apparatus comprising a detector as in claim 8 and circuit means connected to respective external terminals for anodes of said arrays for combining outputs from respective portions of the detector corresponding to its said sub-arrays to provide a single indication of the total flux density of polychromatic radiation being detected by the apparatus.

References Cited in the file of this patent

UNITED STATES PATENTS

| | | |
|---|---|---|
| 2,440,511 | Hare | Apr. 27, 1948 |
| 2,445,305 | Hochgesang | July 13, 1948 |
| 2,469,460 | Fearon | May 10, 1949 |
| 2,536,314 | Scherbatskoy | Jan. 2, 1951 |
| 2,649,554 | Anton | Aug. 18, 1953 |

FOREIGN PATENTS

| | | |
|---|---|---|
| 715,337 | Germany | Dec. 19, 1941 |

OTHER REFERENCES

A more Sensitive Design of the G-M Counter, Cuykendall Rev. of Sci. Ins. Dec. 1933.